United States Patent
Podgorski et al.

(10) Patent No.: US 11,285,638 B2
(45) Date of Patent: Mar. 29, 2022

(54) METHOD OF FABRICATING A COMPOSITE MATERIAL PART BY INJECTING A FILLED SLURRY INTO A FIBER TEXTURE

(71) Applicant: SAFRAN, Paris (FR)

(72) Inventors: Michael Podgorski, Moissy-Cramayel (FR); Bruno Dambrine, Moissy-Cramayel (FR); Edu Ruiz, Montreal (CA)

(73) Assignee: SAFRAN, Paris (FR)

( * ) Notice: Subject to any disclaimer, the term of this patent is extended or adjusted under 35 U.S.C. 154(b) by 373 days.

(21) Appl. No.: 16/096,034

(22) PCT Filed: Apr. 19, 2017

(86) PCT No.: PCT/FR2017/050931
§ 371 (c)(1),
(2) Date: Oct. 24, 2018

(87) PCT Pub. No.: WO2017/187050
PCT Pub. Date: Nov. 2, 2017

(65) Prior Publication Data
US 2019/0134848 A1    May 9, 2019

(30) Foreign Application Priority Data

Apr. 25, 2016    (FR) ...................................... 1653635

(51) Int. Cl.
*B28B 23/00*  (2006.01)
*F01D 5/28*  (2006.01)
(Continued)

(52) U.S. Cl.
CPC ............ *B28B 23/0006* (2013.01); *B28B 1/24* (2013.01); *B28B 7/368* (2013.01); *B28B 7/46* (2013.01);
(Continued)

(58) Field of Classification Search
CPC ... B28B 23/0006; B28B 1/265; B28C 33/314; B29C 41/16; B29C 33/3814
See application file for complete search history.

(56) References Cited

U.S. PATENT DOCUMENTS

| 4,814,127 A | 3/1989 | Toyoda |
| 4,867,662 A * | 9/1989 | Shimahara .............. B28B 1/263 |
| | | 425/85 |

(Continued)

FOREIGN PATENT DOCUMENTS

| EP | 2 481 558 A1 | 8/2012 |
| FR | 2 702 475 A1 | 9/1994 |

(Continued)

OTHER PUBLICATIONS

Machine translation FR3026626 (Year: 2016).*

(Continued)

*Primary Examiner* — Jacob T Minskey
*Assistant Examiner* — Wayne K. Swier
(74) *Attorney, Agent, or Firm* — Pillsbury Winthrop Shaw Pittman LLP (57) ABSTRACT

A method of fabricating a composite material part includes placing a fiber texture in a mold including in its bottom portion a porous material part on which a first face of the texture rests, injecting a liquid under pressure into the fiber texture, the liquid containing a powder of refractory ceramic particles, and draining through the porous material part the liquid that has passed through the fiber texture, while retaining the powder of refractory ceramic particles inside said texture by the porous material part. A perforated rigid element is interposed between the bottom of the mold and the porous material part.

10 Claims, 4 Drawing Sheets

(51) Int. Cl.

| | | |
|---|---|---|
| *C04B 35/584* | (2006.01) | |
| *C04B 35/56* | (2006.01) | |
| *C04B 35/18* | (2006.01) | |
| *B28B 7/36* | (2006.01) | |
| *C04B 35/626* | (2006.01) | |
| *C04B 35/58* | (2006.01) | |
| *C04B 35/14* | (2006.01) | |
| *C04B 35/565* | (2006.01) | |
| *B28B 7/46* | (2006.01) | |
| *C04B 35/447* | (2006.01) | |
| *C04B 35/488* | (2006.01) | |
| *C04B 35/117* | (2006.01) | |
| *C04B 35/185* | (2006.01) | |
| *D03D 1/00* | (2006.01) | |
| *D03D 11/00* | (2006.01) | |
| *B28B 19/00* | (2006.01) | |
| *B28B 1/24* | (2006.01) | |
| *C04B 35/80* | (2006.01) | |
| *B01D 29/05* | (2006.01) | |
| *B01D 29/82* | (2006.01) | |
| *C04B 35/622* | (2006.01) | |

(52) U.S. Cl.
CPC ............ *B28B 19/00* (2013.01); *C04B 35/117* (2013.01); *C04B 35/14* (2013.01); *C04B 35/18* (2013.01); *C04B 35/185* (2013.01); *C04B 35/447* (2013.01); *C04B 35/488* (2013.01); *C04B 35/56* (2013.01); *C04B 35/565* (2013.01); *C04B 35/58* (2013.01); *C04B 35/584* (2013.01); *C04B 35/5805* (2013.01); *C04B 35/58071* (2013.01); *C04B 35/6263* (2013.01); *C04B 35/6264* (2013.01); *C04B 35/80* (2013.01); *D03D 1/0088* (2013.01); *D03D 11/00* (2013.01); *F01D 5/282* (2013.01); *F01D 5/284* (2013.01); *B01D 29/05* (2013.01); *B01D 29/822* (2013.01); *B01D 2201/0423* (2013.01); *C04B 35/622* (2013.01); *C04B 2235/5224* (2013.01); *C04B 2235/5228* (2013.01); *C04B 2235/5232* (2013.01); *C04B 2235/5244* (2013.01); *C04B 2235/5248* (2013.01); *C04B 2235/5252* (2013.01); *C04B 2235/5256* (2013.01); *C04B 2235/5436* (2013.01); *C04B 2235/602* (2013.01); *C04B 2235/616* (2013.01); *D10B 2401/16* (2013.01); *F05D 2230/21* (2013.01); *F05D 2230/40* (2013.01); *F05D 2300/6033* (2013.01); *F05D 2300/6034* (2013.01)

(56) References Cited

U.S. PATENT DOCUMENTS

| | | | |
|---|---|---|---|
| 5,143,604 | A | 9/1992 | Bernard et al. |
| 5,451,152 | A * | 9/1995 | Funahashi .......... B29C 33/3814 |
| | | | 425/85 |
| 5,489,408 | A * | 2/1996 | Nakano ................ C04B 35/584 |
| | | | 264/624 |
| 7,059,845 | B2 * | 6/2006 | Mazzanti ................ B28B 1/262 |
| | | | 249/141 |
| 8,931,751 | B2 | 1/2015 | Funke et al. |
| 9,302,946 | B2 * | 4/2016 | Ritti ....................... C04B 35/185 |
| 2005/0230863 | A1 * | 10/2005 | Scott ........................ B29C 41/16 |
| | | | 264/87 |
| 2012/0177501 | A1 | 7/2012 | Cairo et al. |
| 2012/0217670 | A1 * | 8/2012 | Ruiz ..................... B29C 70/546 |
| | | | 264/71 |
| 2013/0082417 | A1 | 4/2013 | Gummel et al. |
| 2017/0369382 | A1 * | 12/2017 | Billotte Cabre .......... B28B 1/52 |

FOREIGN PATENT DOCUMENTS

| | | | | |
|---|---|---|---|---|
| FR | 2 958 933 | A1 | 10/2011 | |
| FR | 3036626 | A1 * | 12/2016 | ......... C04B 38/0003 |
| RU | 2568715 | C2 | 11/2015 | |
| RU | 2586033 | C2 | 6/2016 | |
| UA | 99267 | C2 | 8/2012 | |
| WO | WO-2016102839 | A1 * | 6/2016 | ....... C04B 35/62886 |

OTHER PUBLICATIONS

Machine translation WO2016102839 (Year: 2016).*
International Search Report as issued in International Patent Application No. PCT/FR2017/050931, dated Jul. 18, 2017.

* cited by examiner

METHOD OF FABRICATING A COMPOSITE MATERIAL PART BY INJECTING A FILLED SLURRY INTO A FIBER TEXTURE

CROSS REFERENCE TO RELATED APPLICATIONS

This application is the U.S. National Stage of PCT/FR2017/050931 filed Apr. 19, 2017, which in turn claims priority to French Application No. 1653635, filed Apr. 25, 2016. The contents of both applications are incorporated herein by reference in their entirety.

BACKGROUND OF THE INVENTION

The present invention relates to a method of fabricating a thermostructural part out of composite material, in particular material of the oxide/oxide or ceramic matrix composite (CMC) type, i.e. comprising fiber reinforcement made from refractory ceramic material fibers densified by a matrix that is likewise made of refractory ceramic material.

Parts made of oxide/oxide composite material are generally prepared by draping in a mold a plurality of fiber plies made from refractory oxide fibers, with each ply being previously impregnated with a slurry filled with refractory oxide particles. The set of plies as arranged in this way is then compacted by a mold cover or by a vacuum bag and by passing via an autoclave. The resulting filled preform is then subjected to sintering or to ceramization heat treatment in order to form a refractory oxide matrix in the preform and obtain an oxide/oxide composite material part. That technique can also be used for making parts out of ceramic matrix composite (CMC) material. Under such circumstances, the fiber plies are made from silicon carbide (SiC) fibers or carbon fibers and they are impregnated with a slurry filled with particles of carbide (e.g. SiC), or boride (e.g. $TiB_2$), or of nitride ($Si_3N_4$).

Nevertheless, that type of preparation makes it possible only to obtain oxide/oxide composite or CMC material parts having mechanical characteristics that are limited in certain directions. In particular, those materials withstand delamination poorly and they do not withstand shear forces well.

Making fiber textures that are obtained by three-dimensional weaving between continuous warp and weft yarns serves to increase the mechanical strength of the material, and in particular its ability to withstand delamination. Under such circumstances, and likewise for thick 2D fiber textures, only methods that make use of a pressure gradient such as infusion type methods, injection molding by the resin transfer molding (RTM) technique or by submicrometer particle suction (SPS) enable a filled slurry to penetrate into the fiber texture that is of thickness which may be as much as several tens of millimeters, depending on the intended applications.

Nevertheless, the pressure gradient between the portion of the fiber texture through which the filled slurry is injected and the other portion of the fiber texture through which the liquid of the slurry is to be evacuated is difficult to control over the entire fiber texture. If the pressure is not balanced over the entire area of the fiber texture facing the bottom of the mold, which includes one or more discharge vents through which the liquid phase of the slurry is to be discharged, then a pressure difference becomes established between the zones close to the vents and the zones that are further away. Under such circumstances, it is difficult to remove the liquid phase since it needs to be withdrawn from the texture without disturbing the distribution of solid particles (refractory oxide, carbide, boride, nitride, etc.) that have been deposited by the slurry. Specifically, while it is being discharged, the liquid phase can take particles with it and/or can modify the distribution of the particles within the fiber texture so as to lead to large pores appearing in the final material as a result of a lack of matrix in certain locations.

OBJECT AND SUMMARY OF THE INVENTION

An object of the present invention is to remedy the above-mentioned drawbacks and to propose a solution that makes it possible to make parts out of composite material, in particular of oxide/oxide or CMC type, while also using a fiber texture that is thick and/or of complex shape, and to do so in a manner that is fast and reliable while providing good control over the deposition and the distribution of solid particles within the fiber texture so as to obtain a material without any macropores.

To this end, the invention provides a method of fabricating a composite material part, the method comprising the following steps:

forming a fiber texture from refractory ceramic fibers;

placing the fiber texture in a mold including in its bottom portion a part made of porous material on which a first face of said texture rests;

closing the mold with a mold cover or lid placed facing a second face of the fiber texture;

injecting a liquid under pressure into the fiber texture, the liquid containing a powder of refractory ceramic particles or of refractory ceramic precursor particles;

draining via the porous material part the liquid that has passed through the fiber texture, while said porous material part retains the powder of refractory ceramic particles or of refractory ceramic precursor particles within said texture so as to obtain a fiber preform filled with refractory ceramic particles or with refractory ceramic precursor particles, the liquid being discharged via at least one vent present in the bottom of the mold, a perforated rigid element being interposed between the bottom of the mold and the porous material part;

drying the fiber preform;

unmolding the fiber preform; and subjecting the refractory ceramic particles or the refractory ceramic precursor particles present in the fiber preform to heat treatment so as to form a refractory ceramic matrix in said preform;

a perforated rigid element being interposed between the bottom of the mold and the porous material part;

the method being characterized in that the perforated rigid element includes notches or cutouts in its bottom face in contact with the inside surface of the bottom of the mold.

By using a porous material part for draining the liquid of the slurry, the method of the invention makes it possible to eliminate the liquid that is introduced into the fiber texture without eliminating the refractory ceramic solid particles or the refractory ceramic precursor particles that are also present in the texture. In addition, by interposing a perforated rigid element between the bottom of the mold and the porous material part, it is possible to obtain balanced pressure over the bottom face of the porous material part, through which face the liquid is discharged. Because of the presence of a perforated rigid element between the bottom of the mold and the porous material part, the liquid can flow between the porous material part and the bottom of the mold and can easily reach the discharge vent(s), regardless of where the liquid leaves the porous material part. In addition, the presence of notches or cutouts in the bottom face of the perforated rigid element in contact with the inside surface of the bottom of the mold serves to facilitate the flow of the liquid towards the discharge vent(s).

With the method of the invention, eliminating the liquid by draining does not disturb the distribution of particles within the fiber texture and, consequently, makes it possible to obtain a composite material part with a uniform distribution of the matrix throughout the fiber reinforcement. Consequently, the thermostructural composite material part presents improved mechanical properties.

In a first particular aspect of the method of the invention, the perforated rigid element has a plurality of perforations, each perforation presenting a rectangular shape of sides extending over a distance less than or equal to 5 millimeters (mm) or a circular shape of diameter less than or equal to 5 mm.

In a second particular aspect of the method of the invention, the perforated rigid element presents a thickness of about 1 mm.

In a fourth particular aspect of the method of the invention, the perforated rigid element is made of a material selected from the following materials: polytetrafluoroethylene (PTFE); a metal material; a polymer; etc.

In an implementation of the method of the invention, the mold in which the fiber texture is placed comprises an impregnation chamber including in its bottom portion the porous material part on which a first face of the texture rests, the impregnation chamber being closed in its top portion by a deformable impermeable diaphragm placed facing a second face of the fiber texture, said diaphragm separating the impregnation chamber from a compacting chamber, the liquid containing refractory ceramic particles or of refractory ceramic precursor particles being injected into the impregnation chamber between the second face of the fiber texture and the diaphragm, a compacting fluid being injected into the compacting chamber, the fluid exerting pressure on the diaphragm in order to force the filled liquid containing the powder of refractory ceramic particles or of refractory ceramic precursor particles to pass through the fiber texture. During the step of forming the fiber texture, the yarns may be woven with three-dimensional weaving or multilayer weaving. The fiber texture may equally well be made by stacking plies woven using two-dimensional weaving, the texture presenting a thickness of at least 0.5 mm and preferably of at least 1 mm.

The yarns of the preform may be made of fibers constituted by one or more of the following materials: alumina; mullite; silica; an aluminosilicate; a borosilicate; silicon carbide; and carbon.

The refractory ceramic particles may be made of a material selected from: alumina; mullite; silica; an aluminosilicate; an aluminophosphate; zirconia; a carbide; a boride; and a nitride.

In an implementation, the resulting composite material part may constitute a turbine engine blade or indeed an afterbody part, a combustion chamber, a flap, or an afterburner arm, etc.

BRIEF DESCRIPTION OF THE DRAWINGS

Other characteristics and advantages of the invention appear from the following description of particular implementations of the invention given as non-limiting examples, with reference to the accompanying drawings, in which.

DETAILED DESCRIPTION OF IMPLEMENTATIONS

The method in accordance with the present invention for fabricating a composite material, in particular of the oxide/oxide or CMC type, begins by making a fiber texture that is to form the reinforcement of the part.

In known manner, the fiber structure is made by weaving using a Jacquard type loom having a bundle of warp yarns or strands arranged in a plurality of layers, the warp yarns being interlinked by weft yarns, or vice versa. The fiber texture may be made by stacking plies obtained by two-dimensional (2D) weaving. The fiber texture may also be made directly as a single part by three-dimensional (3D) weaving. The term "two-dimensional weaving" is used herein to mean a conventional weaving technique in which each weft yarn passes from one side to the other of the yarns in a single layer of warp yarns, or vice versa. The method of the invention is particularly suitable for enabling a filled slurry to be introduced into 2D fiber textures, i.e. textures obtained by stacking 2D plies, and that are of considerable thickness, i.e. 2D fiber structures having a thickness of at least 0.5 mm, and preferably of at least 1 mm.

The terms "three-dimensional weaving" or "3D weaving", or indeed "multilayer weaving", are used herein to mean a weaving technique in which at least some of the weft yarns interlink warp yarns over a plurality of layers of warp yarns or vice versa, using a weave that may in particular be selected from the following weaves: interlock, multi-plain, multi-satin, and multi-twill.

The term "interlock weave or fabric" is used herein to mean a 3D weave in which each layer of warp yarns interlinks a plurality of layers of weft yarns with all of the yarns in a given warp column having the same movement in the weave plane.

The term "multi-plain weave or fabric" is used herein to mean a 3D weave with a plurality of layers of weft yarns in which the base weave of each layer is equivalent to a conventional plain type weave, but with certain points of the weave that link together the layers of weft yarns.

The term "multi-satin weave or fabric" is used herein to mean a 3D weave with a plurality of layers of weft yarns in which the base weave of each layer is equivalent to a conventional satin type weave, but with certain points of the weave that link together the layers of weft yarns.

The term "multi-twill weave or fabric" is used herein to mean a 3D weave with a plurality of layers of weft yarns in which the base weave of each layer is equivalent to a conventional twill type weave, but with certain points of the weave that link together the layers of weft yarns.

3D textures present a configuration that is complex and into which it is difficult to introduce solid particles in suspension and to distribute them in uniform manner. The method of the invention is also very well adapted to introducing a filled slurry into 3D woven fiber textures.

The yarns used for weaving the fiber texture that is to form the fiber reinforcement of the composite material part may in particular be made of fibers constituted by any of the following materials: alumina, mullite, silica, an aluminosilicate, a borosilicate, silicon carbide, carbon, or a mixture of a plurality of these materials.

Figure 1:
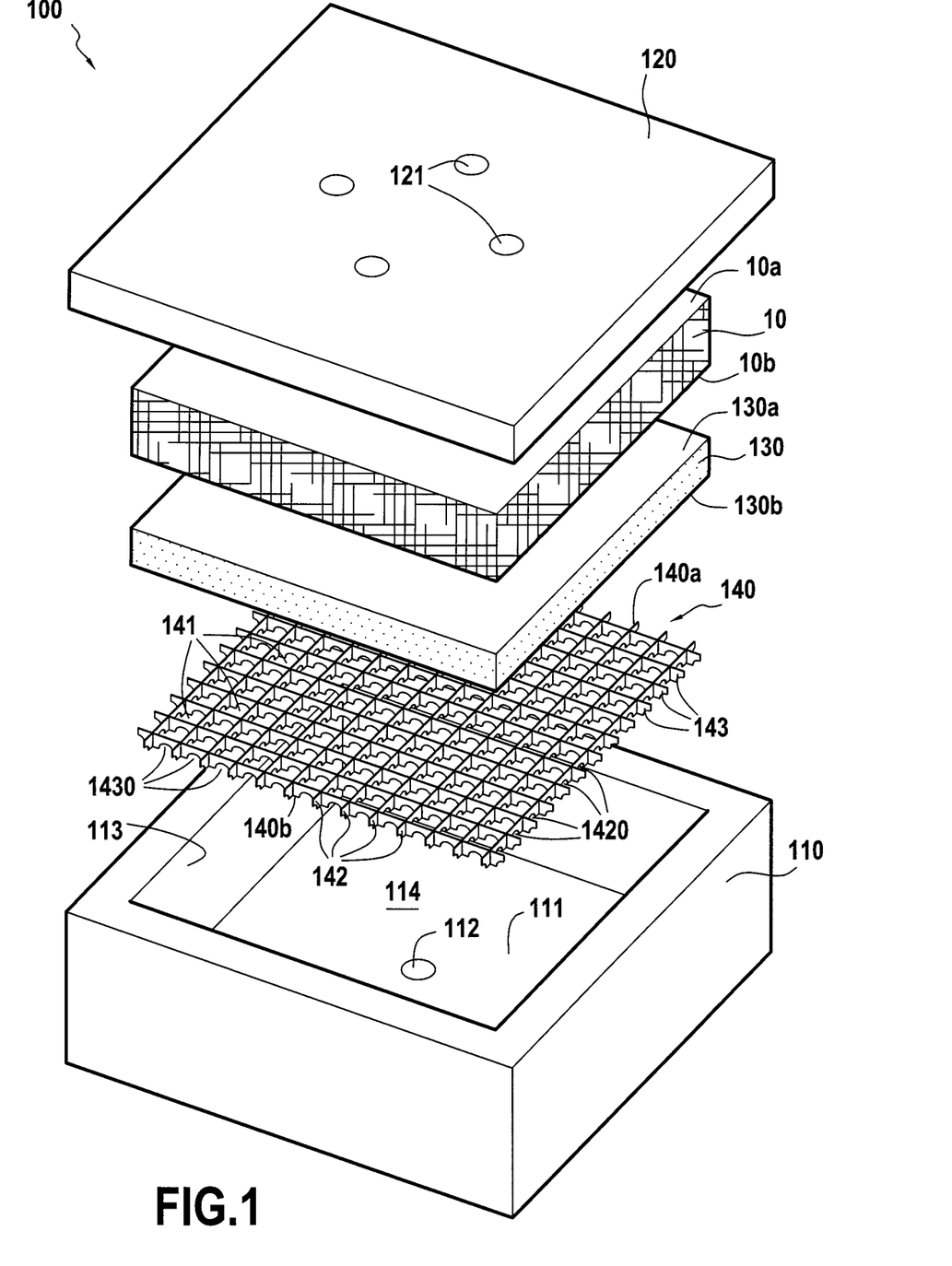
FIG. 1 is a diagrammatic exploded perspective view of tooling in accordance with an implementation of the invention.
Figure 2:
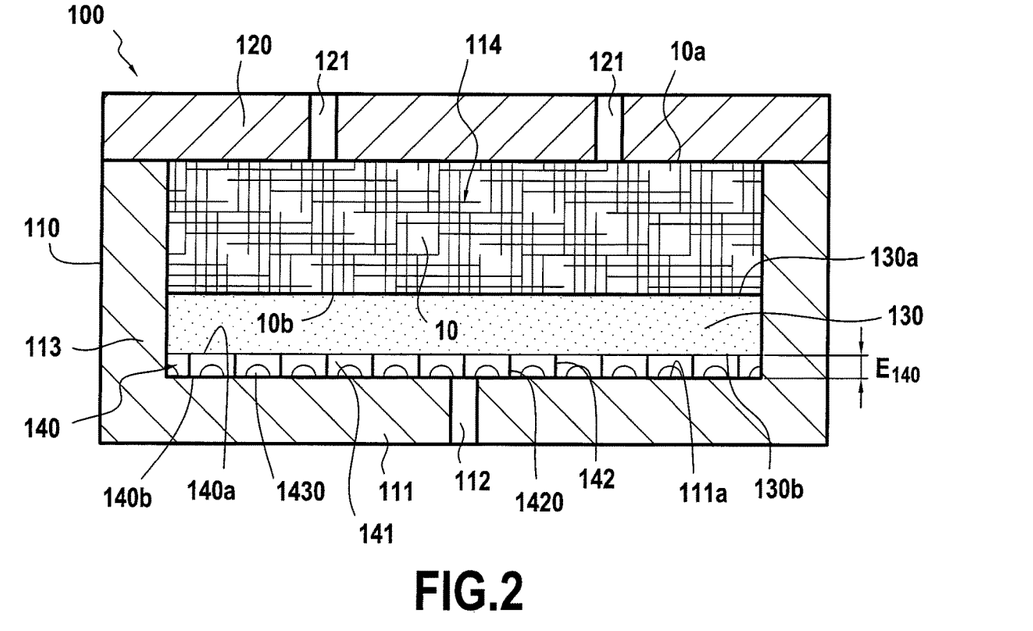
FIG. 2 is a diagrammatic section view showing the FIG. 1 tooling closed with a fiber texture positioned therein.

Once the fiber texture has been made, it is placed in tooling in accordance with the invention that serves, as explained below, to deposit refractory ceramic particles or refractory ceramic precursor particles within the fiber texture. For this purpose, and as shown in FIGS. 1 and 2, a fiber texture 10 is placed in tooling 100. In the presently-described example, the fiber texture 10 is made using one of the above-defined techniques (stacking 2D plies or 3D weaving) using yarns made of Nextel 610™ alumina. The fiber texture 10 in this example is for forming the fiber reinforcement of an oxide/oxide composite material blade.

The tooling 100 comprises a mold 110 and a mold cover 120. The mold 110 has a bottom 111 with a vent 112. The mold 110 also has a side wall 113 that co-operates with the bottom 111 to form a mold cavity 114. In the example shown, the tooling 100 in which the fiber texture 10 is present is closed in its bottom portion by the mold 110 and is closed in its top portion by the mold cover 120 forming a lid that closes the tooling 100. The mold 110 and the mold cover 120 serve to determine the dimensions of the preform and thus of the part that is to be obtained, and also to adjust the fiber volume fraction in the part that is to be obtained.

The mold cover 120 has a plurality of injection ports 121 through which a liquid filled with refractory ceramic particles or with refractory ceramic precursor particles is to be injected in order penetrate into the pores of the fiber texture 10 through the first face 10a of the fiber texture 1. In the example shown in FIGS. 1 and 2, the filled liquid is for injecting through a plurality of injection ports 121 that open out into different zones of the mold cavity. Nevertheless, it would not go beyond the ambit of the invention for the liquid to be injected through a single injection pore.

The mold 110 has a single discharge vent 112 for the liquid. Naturally, it would not go beyond the ambit of the invention to make use of a plurality of outlet vents.

A porous material part 130 is present in the mold cavity 114 between the mold 110 and the fiber texture 10. The porous material part 130 presents a top face 130a in contact with the second face 10b of the fiber texture 10 through which the liquid is to be drained. In the examples shown in FIGS. 1 and 2, the second face 10b of the fiber texture 10 is situated opposite from the first face 10a through which the slurry is to penetrate into the texture 1. The liquid filled with refractory ceramic particles may also be injected via the sides of the preform.

By way of example, the porous material part 130 may be made of microporous polytetrafluoroethylene (PTFE) such as the "microporous PTFE" products sold by the supplier Porex®. By way of example, for making the porous material part 130, it is possible to use the PM 0130 material sold by the supplier Porex® and presenting pores of size lying in the range 1 micrometer (μm) to 2 μm.

The porous material part 130 enables the liquid to be drained out from the fiber texture 10 and discharge via the outlet vent 112 as a result of applying a pressure gradient between the outlet vent 112 and the injection ports 121.

By way of example, the porous material part 130 may have thickness that is greater than or equal to 1 mm, or indeed several millimeters. The mean porosity of the porous material part 130 may be about 30%. The mean size (D50) of the pores of the porous material part may lie in the range 1 μm to 2 μm, for example.

In an implementation, the porous material part 130 may be rigid and present a shape that corresponds to the shape of the preform and of the composite material part that is to be obtained. By way of example, under such circumstances, the porous material part may be made by thermoforming. In a variant, the porous material part may be deformable and may take on the shape of the mold which corresponds to the shape of the preform plus the shape of the composite material part that is to be obtained.

In accordance with the invention, a perforated rigid element 140 is interposed between the bottom 111 of the mold 110 and the porous material part 130. More precisely, the perforated rigid element 140 presents a top face 140a in contact with the bottom face 130b of the porous material part 130 and a bottom face 140b in contact with the inside surface 111a of the bottom 111 of the mold 110.

In the presently-described example, the perforated rigid element 140 presents the form of a grid made up of perpendicularly crossing walls 142 and walls 143, the walls 142 and 143 defining between them perforations 141 that are of rectangular shape. The perforations 141 preferably have sides of length less than or equal to 5 mm in order to avoid any local deformation of the porous material part 130. By way of example, the perforated rigid element 140 may present thickness $E_{140}$ that is less than or equal to 1 mm.

The perforated rigid element is made out of a material that is chemically and/or mechanically compatible both with the liquid injected into the fiber texture and with the porous material part. In the presently-described example, the perforated rigid element 140 is made of polytetrafluoroethylene (PTFE) like the porous material part 130.

According to a characteristic of the present invention, the bottom face 140b of the rigid element 140 that is in contact with the inside face 111a of the bottom 111 of the mold 110 has notches or cutouts 1420 and 1430 in association with the walls 142 and 143 so as to facilitate the flow of liquid towards the outlet vent 112.

Before injecting a slurry into the fiber texture 10, compacting pressure for compacting the fiber texture 10 between the mold 110 and the mold cover 120 may be applied by clamping the mold or by means of a press, the compacting pressure possibly being maintained during injection.

In a variant, the compacting pressure may be applied after starting to inject the filled liquid, and may then be maintained. Applying compacting pressure can serve to compact the texture in order to assist draining the liquid and to reach a target thickness for the fiber preform without damaging it.

Figure 3:
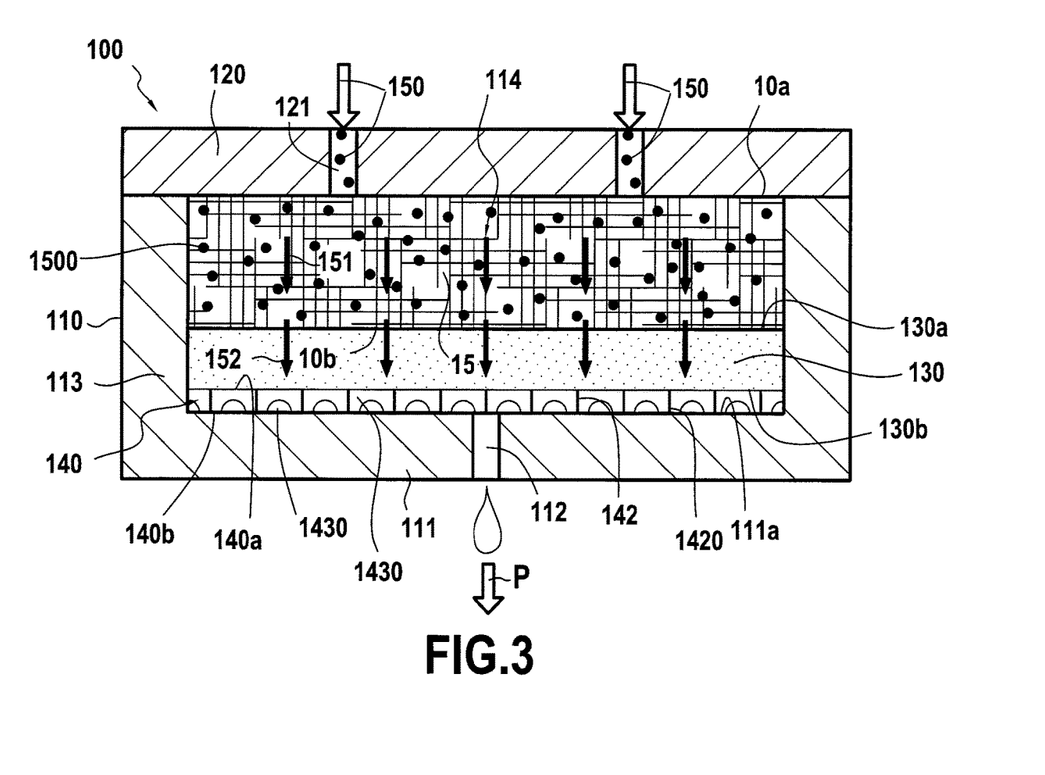
FIG. 3 is a diagrammatic section view showing the steps of impregnating a fiber texture with a filled slurry in the FIG. 2 tooling.

In the presently-described example, the filled liquid corresponds to a slurry containing refractory ceramic particles. FIG. 3 shows the configuration that is obtained while a slurry 150 is being injected and while its liquid medium is being drained. The slurry 150 is injected under pressure via the injection ports 121 so as to penetrate into the fiber texture 10 through its first face 10a. The refractory ceramic particles 1500 present in the slurry 150 are to enable a refractory ceramic matrix to be formed in the pores of the fiber texture 10. In an implementation, the refractory ceramic matrix may be a refractory oxide matrix.

By way of example, the slurry may be a suspension of alumina powder in water. The mean particle size (D50) of the alumina powder may lie in the range 0.1 μm to 0.3 μm. The alumina powder used may be an alpha alumina powder sold by the supplier Baikowski under the name SM8.

More generally, the slurry may be a suspension having refractory ceramic particles presenting a mean particle size lying in the range 0.1 µm to 10 µm. The volume fraction of refractory ceramic particles in the slurry prior to injection may lie in the range 20% to 40%. The refractory ceramic particles may comprise a material selected from: alumina, mullite, silica, an aluminosilicate, an aluminophosphate, zirconia, a carbide, a boride, and a nitride. Depending on their base composition, the refractory ceramic particles may also be mixed with particles of alumina, of zirconia, of aluminosilicate, of a rare earth oxide, of a rare earth silicate (which may be used for example in environmental or thermal barriers), or any other filler serving to functionalize the composite material part that is to be obtained, such as carbon black, graphite, or silicon carbide.

By way of example, the liquid medium of the slurry may comprise an aqueous phase presenting an acid pH (i.e. a pH less than 7) and/or an alcohol phase, e.g. comprising ethanol. The slurry may include an acidifier such as nitric acid, and the pH of the liquid medium may lie in the range 1.5 to 4, for example. The slurry may also include an organic binder such as polyvinyl alcohol (PVA), which is soluble in water, in particular.

As shown in FIG. 3, the refractory ceramic particles 1500 are present after the slurry 150 has been injected into the pores of the fiber texture 10. Arrows 151 represent the movement of the slurry 150 as injected into the fiber texture 10. Arrows 152 represent the movement of the liquid phase or medium of the slurry as drained by the porous material part 130.

The mold cover 120 exerts pressure on the fiber texture 10 during and after the injection step.

During draining, it is also possible to apply pumping P via the outlet vent 112, e.g. by using a primary vacuum pump. Performing such pumping serves to improve drainage and to dry the fiber texture more quickly.

Alternatively, or in combination, during draining it is possible to heat the liquid medium still present in the pores of the fiber texture in order to evaporate it through the second face of the fiber texture and the porous material part. For example, the temperature of the liquid medium may be raised to a temperature lying in the range 80° C. to 105° C.

In this configuration, the porous material part 130 serves to retain within the fiber texture 10 the refractory ceramic particles 1500 that were initially present in the slurry and to ensure that some or all of these particles become deposited by filtering in the fiber texture 10.

Once the injection and draining steps have been carried out, a fiber preform 15 is obtained that is filled with refractory ceramic particles, e.g. particles of refractory ceramic oxide, e.g. of alumina.

The resulting preform is then dried and then unmolded, and because of the presence of a binder such as PVA in the slurry, after unmolding, the preform is capable of conserving the shape it adopted in the mold cavity, e.g. the shape adopted after being compacted between the mold and the mold cover.

Thereafter, the preform is subjected to heat treatment, sintering in this example, e.g. in air at a temperature lying in the range 1000° C. to 1200° C. in order to sinter the refractory ceramic particles so as to form a refractory ceramic matrix in the pores of the fiber preform. A composite material part is thus obtained, e.g. a part made of oxide/oxide composite material, having fiber reinforcement formed by the fiber preform and presenting a high matrix volume fraction with the refractory ceramic matrix being uniformly distributed throughout the fiber reinforcement.

A part made of CMC material other than an oxide/oxide material can be obtained in the same manner by making the fiber texture with silicon carbide fibers and/or carbon fibers and by using a slurry filled with particles of carbide (e.g. SiC), of boride (e.g. $TiB_2$), or of nitride ($Si_3N_4$).

In a variant, the filled liquid that is injected into the preform may include particles of a refractory ceramic precursor, e.g. of sol-gel or polymer type. Under such circumstances, the heat treatment includes at least one step of transforming the refractory ceramic precursor into a ceramic material (referred to as a "ceramization" step), optionally followed by an additional sintering step in order to further densify the composite material part.

Figure 4:
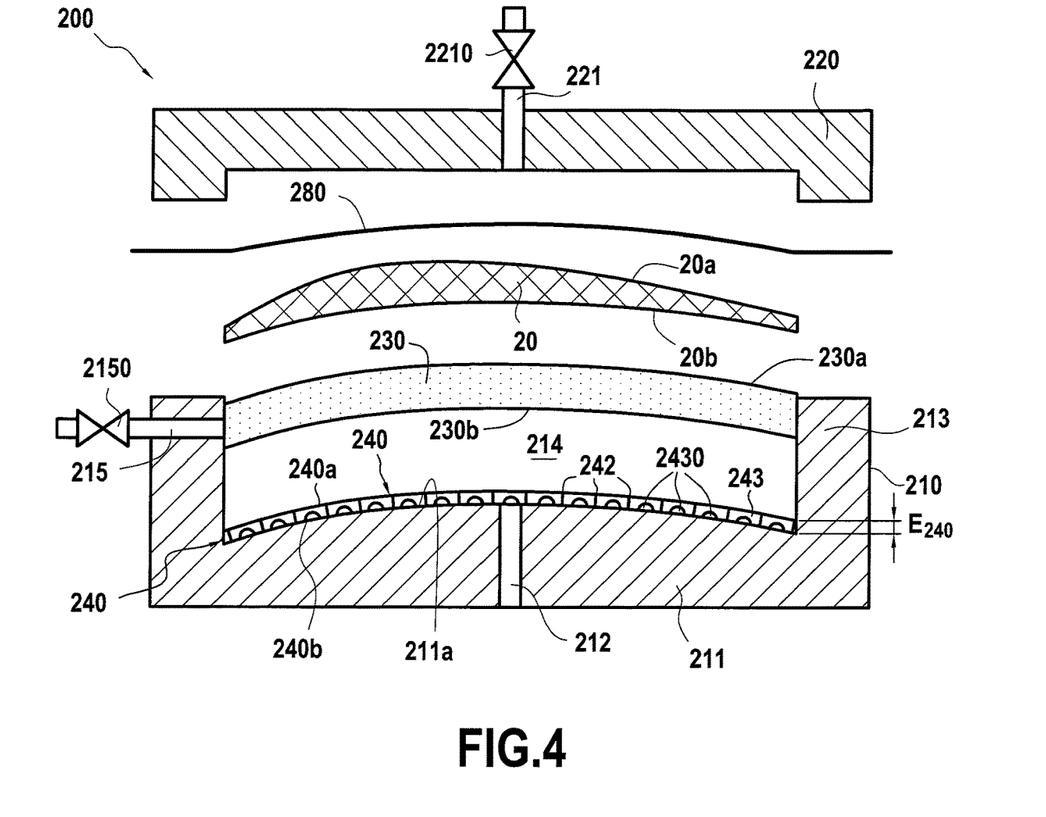
FIG. 4 is a diagrammatic exploded perspective view showing tooling in accordance with another implementation of the invention.
Figure 5:
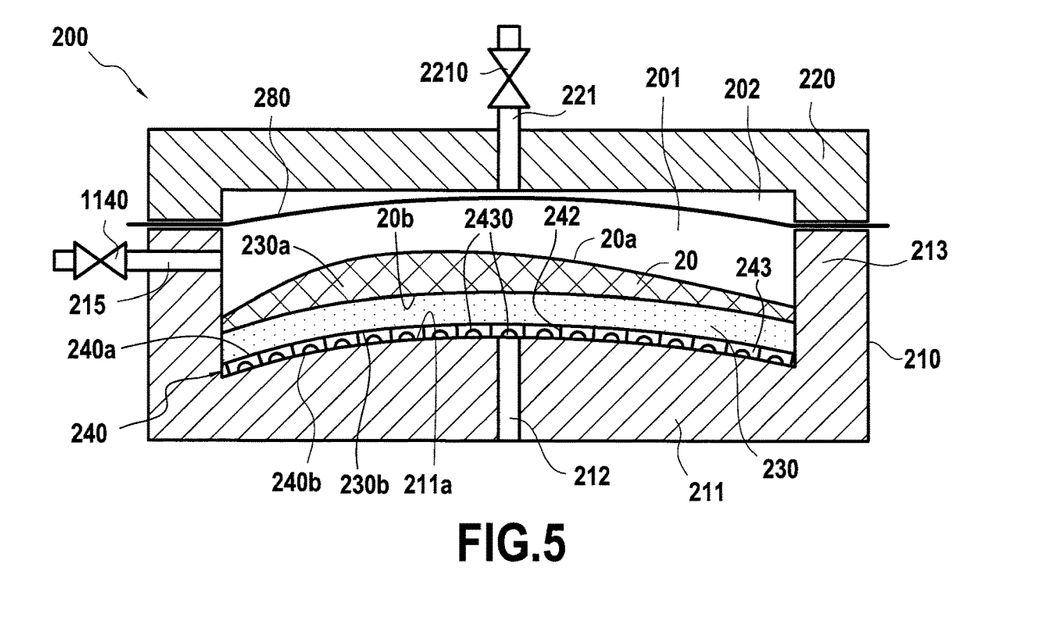
FIG. 5 is a diagrammatic section view showing the FIG. 4 tooling closed with a fiber texture positioned therein.

FIGS. 4 to 7 show a method of fabricating a composite material part in another implementation of the invention. As shown in FIGS. 4 and 5, a fiber texture 20 is placed in tooling 200. In the presently-described example, the fiber texture 20 is made using any one of the above-defined techniques (stacking 2D plies or 3D weaving) using yarns made of Nextel 610™ alumina. In this example, the fiber texture 20 is for forming the fiber reinforcement of an oxide/oxide composite material blade.

The tooling 200 comprises a mold 210 having a bottom 211 that is provided with a vent 212. The mold 210 also has a side wall 213 including an injection port 215 fitted with a valve 2150. A porous material part 230 is placed under the fiber texture 20, the porous material part 120 having a top face 230a for receiving the fiber texture 20. In the presently-described example, the part 230 is made of a deformable material so as to be capable of fitting closely to a shape or a profile that corresponds to the shape of the final part that is to be fabricated as defined by the mold 210, specifically an aeroengine blade. By being shaped, the part 230 presents a shape for its top face 230a that is similar to the shape of the part that is to be fabricated. By way of example, the part 120 may be made of microporous polytetrafluoroethylene (PTFE), such as the "microporous PTFE" products sold by the supplier Porex®. In a variant implementation, the porous material part is rigid and presents a top face of shape corresponding to the shape of the final part that is to be fabricated. Under such circumstances, the part may in particular be made by thermoforming. By way of example, the microporous part may present a thickness of several millimeters and a mean porosity of about 30%. The mean pore size (D50) of the porous material part may lie in the range 1 µm to 2 µm, for example.

In accordance with the invention, a perforated rigid element 240 is interposed between the bottom 211 of the mold 210 and the porous material part 230. More precisely, the perforated rigid element 240 presents a top face 240a in contact with the bottom face 230b of the porous material part 230, and a bottom face 240b in contact with the inside surface 211a of the bottom 211 of the mold 210.

In the presently-described example, and like the perforated rigid element 140 shown in FIG. 1, the perforated rigid element 240 presents the form of a grid made up of perpendicularly crossing walls 242 and 243, the walls 242 and 243 defining between them perforations of rectangular shape. The perforations preferably present sides of length less than or equal to 5 mm in order to avoid local deformation of the porous material part 230. By way of example, the perforated rigid element 240 may present thickness $E_{240}$ that is less than or equal to 1 mm. The perforated rigid element 240 is also shaped to have curvature corresponding to the curvature presented by the surface 211a of the 211 of the mold 210.

The perforated rigid element is made of a material that is chemically and/or mechanically compatible both with the filled liquid injected into the fiber texture and with the porous material part. In the presently-described example, the perforated rigid element 240 is made of polytetrafluoroethylene (PTFE) like the porous material part 230.

According to a characteristic of the present invention, the bottom face 240b of the rigid element 240 in contact with the inside surface 211a of the bottom 211 of the mold 210 includes notches or cutouts 2430 in its walls 243 so as to facilitate the flow of the liquid phase towards the outlet vent 212. The walls 242 also include notches or cutouts (not shown in FIGS. 4 to 7).

The tooling 200 also includes a lid 220 including an injection port 221 fitted with a valve 2210 and a deformable diaphragm 280 that serves, once the tooling has been closed (FIG. 5) to separate an impregnation chamber 201 in which the fiber texture 20 is present from a compacting chamber 202 situated above the diaphragm 280. By way of example, the diaphragm 280 may be made of silicone.

Figure 6:
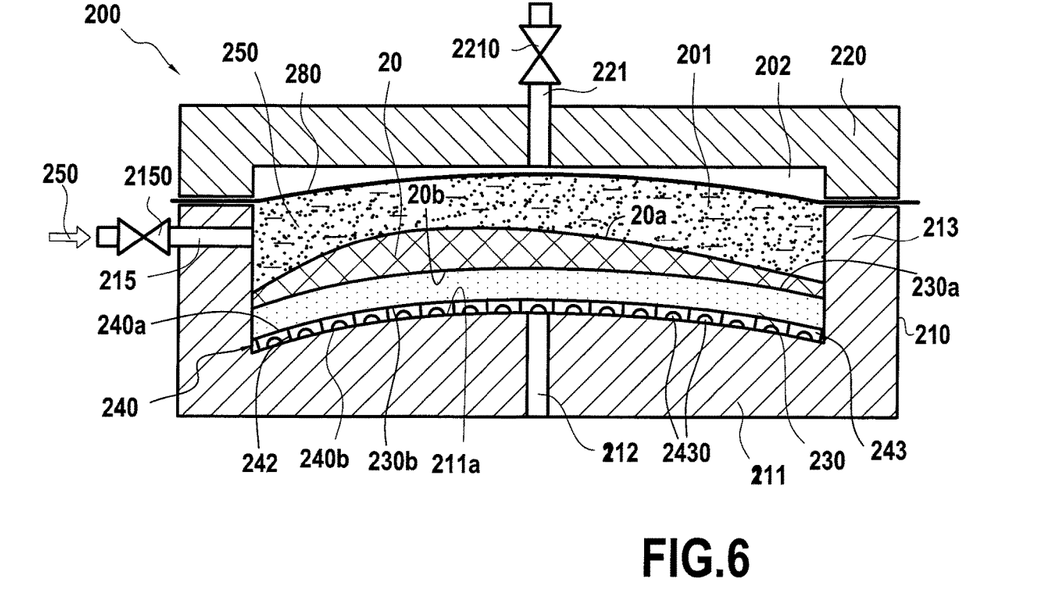
FIGS. 6 and 7 are diagrammatic section views showing the steps of impregnating a fiber texture with a filled slurry in the tooling of FIG. 5.

After the texture 20 has been placed on the top face 230a of the porous material part 230, the mold 210 is closed with the lid 230 (FIG. 5). A filled liquid, specifically a slurry 250, is then injected into the impregnation chamber 201 via the injection port 215 while its valve 2150 is open (FIG. 6). In this example, the slurry 250 is for forming a refractory oxide matrix in the texture. The slurry 250 corresponds to a suspension containing a powder of refractory oxide particles, the particles presenting a mean particle size lying in the range 0.1 μm to 10 μm. The liquid phase of the slurry may be constituted in particular by water (with an acid pH), by ethanol, or by any other liquid in which it is possible to put the desired powder into suspension. An organic binder may also be added (e.g. PVA, which is soluble in water). The binder serves to ensure that the green part holds together after drying and before sintering.

By way of example, the slurry 250 may correspond to an aqueous suspension constituted by alumina powder having a mean particle size (D50) lying in the range 0.1 μm to 0.3 μm and presenting a volume fraction lying in the range 20% to 40%, the suspension being acidified with nitric acid (to have pH lying in the range 1.5 to 4). In addition to alumina, the refractory oxide particles could equally well be selected from alumina, mullite, silica, an aluminosilicate, an aluminophosphate, zirconia, a carbide, a boride, and a nitride. Depending on their base composition, the refractory oxide particles may also be mixed with particles of alumina, of zirconia, of aluminosilicate, of rare earth oxides, of rare earth disilicates (e.g. used in environmental or thermal barriers), or any other filler serving to add specific functions to the final material (carbon black, graphite, silicon carbide, etc.).

The quantity of slurry 250 injected into the impregnation chamber 201 is determined as a function of the volume of the fiber texture 20 that is to be impregnated. It is the quantity of powder that is introduced initially that determines the setting thickness and thus the fiber volume fraction (FVF) and the matrix volume fraction (MVF).

Figure 7:
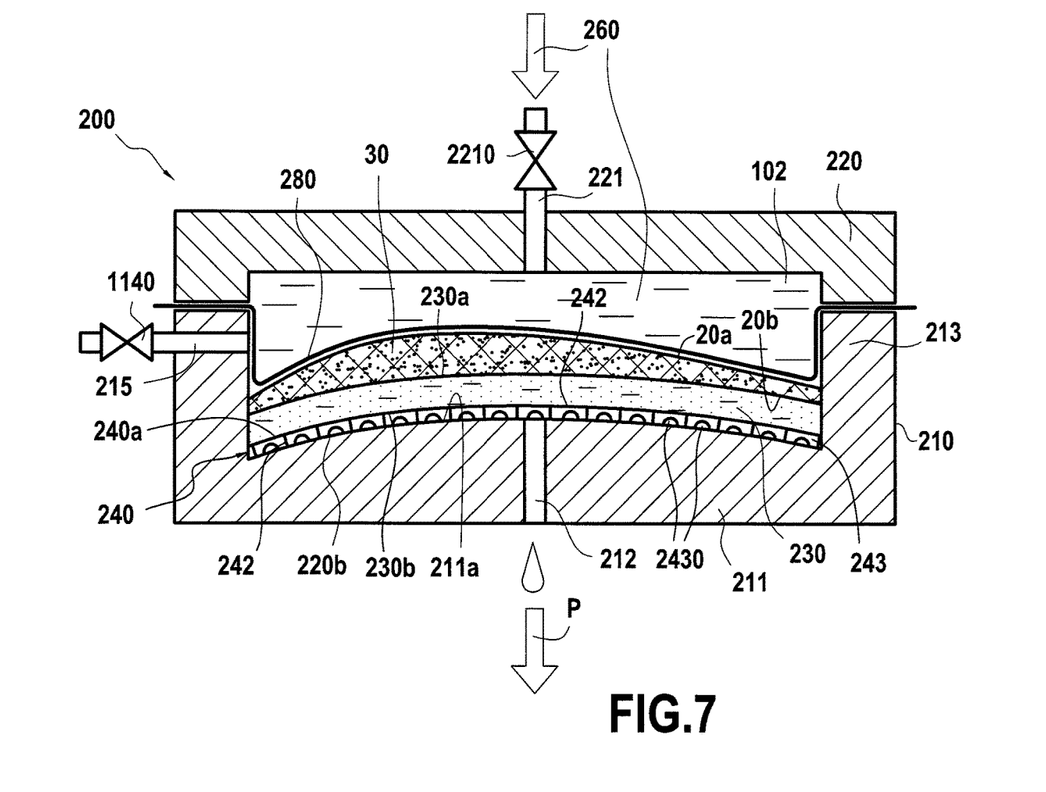

Once the slurry has been injected into the impregnation chamber 201, the compacting operation is performed by injecting a compacting fluid 260, e.g. oil, into the compacting chamber 202 via the injection port 221 while its valve 2210 is open, with the valve 2150 of the injection port 215 previously being closed (FIG. 7). The compression fluid 260 applies pressure on the slurry 250 through the diaphragm 280, thereby forcing the slurry 250 to penetrate into the fiber texture 20. The fluid 260 imposes pressure over the entire diaphragm 280, and consequently on all of the slurry present over the texture 20. The pressure applied by the diaphragm 280 on the slurry and on the fiber texture is preferably less than 15 bar, e.g. 7 bar, so as to cause the slurry to penetrate into the texture and so as to compact the texture sufficiently to enable the liquid phase of the slurry to be drained via the porous material part without degrading the resulting preform.

The porous material part 230 that is situated beside the face 20b of the fiber texture that is opposite from its face 20a through which the slurry penetrates into the texture serves to perform several functions. Specifically, the part 230 allows the liquid of the slurry to be drained out from the fiber texture, with the liquid as drained in this way being discharged in this example via the vent 212. Drainage is performed both during and after the compacting operation. Once no more liquid flows out through the vent 212, drainage is terminated. In combination with applying a pressure on the slurry by means of the compression fluid, it is possible to perform pumping P, e.g. by means of a primary vacuum pump (not shown in FIGS. 4 to 7) via the vent 212. Such pumping is optional. Heating may suffice. Conversely, pumping without heating may suffice. Nevertheless, combining both pumping and heating serves to accelerate drying.

Furthermore, the tooling may be provided with heater means, such as resistor elements incorporated in the walls of the tooling, so as to increase the temperature in the compacting chamber and facilitate evacuating the liquid of the slurry by evaporation. The temperature in the compacting chamber may be arranged to a temperature lying in the range 80° C. to 105° C.

The porous material part 220 serves to retain the solid refractory oxide particles present in the slurry, the refractory oxide particles thus becoming deposited progressively in the fiber texture. This serves subsequently to obtain the matrix (e.g. after sintering).

The part 220 also serves to hold the fiber texture in shape during the compacting operation, since its top face 220a reproduces the shape of the bottom 211 of the mold 210 corresponding to the shape of the final part that is to be fabricated.

A fiber preform 30 is thus obtained that is filled with particles of refractory oxide, specifically particles of alumina of the above-described type. Thereafter, the preform is unmolded by emptying the compression fluid from the compacting chamber 202, with the preform conserving its compaction shape after unmolding because of the presence of a binder such as PVA in the slurry.

Thereafter, the preform is extracted from the tooling and is subjected to sintering heat treatment in air at a temperature lying in the range 1000° C. to 1200° C. in order to sinter the refractory oxide particles together so as to form a refractory oxide matrix in the preform. An oxide/oxide composite material part is thus obtained having fiber reinforcement obtained by 3D weaving and a uniform distribution of the matrix throughout the fiber reinforcement.

A CMC material part may be obtained in the same manner by making the fiber texture out of silica carbide or carbon fibers and by using a slurry filled with particles of carbide carbide (e.g. SiC), of boride (e.g. $TiB_2$), or of nitride ($Si_3N_4$).

In a variant, the filled liquid that is injected into the preform may include particles of a refractory ceramic precursor, e.g. of sol-gel or polymer type. Under such circumstances, the heat treatment includes at least one step of transforming the refractory ceramic precursor into a ceramic material (referred to as a "ceramization" step), optionally followed by an additional step of sintering in order to further densify the composite material part.

The perforated rigid element of the invention may have various forms. In particular, it may be in the form of a grid with rectangular perforations as described above, in the form of a plate having a plurality of circular perforations, or indeed in the form of a cellular structure of honeycomb (e.g. Nida®) type in which the cells constitute the perforations.

As mentioned above, the perforated rigid element is preferably made out of a material that is chemically and/or mechanically compatible both with the slurry injected into the fiber texture and with the porous material part. In particular, the perforated rigid element may be made out of any of the following materials: polytetrafluoroethylene (PTFE); a metal material; a polymer.

The invention claimed is:

1. A method of fabricating a composite material part, the method comprising:
   forming a fiber texture from refractory ceramic fibers;
   placing the fiber texture in a mold including in its bottom portion a part made of porous material on which a first face of said texture rests;
   closing the mold with a mold cover or lid placed facing a second face of the fiber texture;
   injecting a liquid under pressure into the fiber texture, the liquid containing a powder of refractory ceramic particles or of refractory ceramic precursor particles;
   draining via the porous material part the liquid that has passed through the fiber texture, while said porous material part retains the powder of refractory ceramic particles or of refractory ceramic precursor particles within said texture so as to obtain a fiber preform filled with refractory ceramic particles or with refractory ceramic precursor particles, the liquid being discharged via at least one vent present in the bottom of the mold;
   drying the fiber preform;
   unmolding the fiber preform; and
   subjecting the refractory ceramic particles or the refractory ceramic precursor particles present in the fiber preform to heat treatment so as to form a refractory ceramic matrix in said preform;
   a perforated rigid element being interposed between the bottom of the mold and the porous material part, said perforated rigid element comprising walls delimiting separate perforations that extend through an entire thickness of the perforated rigid element;
   wherein the lower edge of said walls in contact with the inside surface of the bottom of the mold includes notches or cutouts to (a) allow said liquid to flow along said inside surface and along a first direction from a first of the perforations to a second of the perforations adjacent the first of the perforations via a first of said notches or cutouts and (b) allow said liquid to flow along said inside surface and along a second direction from said first or second of the perforations to a third of the perforations adjacent the first or second of the perforation via a second of said notches or cutouts, said first direction and said second direction being two different non-parallel directions.

2. A method according to claim 1, wherein the perforated rigid element has a plurality of perforations, each perforation presenting a rectangular shape of sides extending over a distance less than or equal to 5 mm or a circular shape of diameter less than or equal to 5 mm.

3. A method according to claim 2, wherein the perforated rigid element presents a thickness of about 1 mm.

4. A method according to claim 1, wherein the perforated rigid element is made of a material selected from the following materials: polytetrafluoroethylene (PTFE); a metal material; a polymer.

5. A method according to claim 1, wherein the mold in which the fiber texture is placed comprises an impregnation chamber including in its bottom portion the porous material part on which a first face of said texture rests, the impregnation chamber being closed in its top portion by a deformable impermeable diaphragm placed facing a second face of the fiber texture, said diaphragm separating the impregnation chamber from a compacting chamber, the liquid containing the powder of refractory ceramic particles or of refractory ceramic precursor particles being injected into the impregnation chamber between the second face of the fiber texture and the diaphragm, a compacting fluid being injected into the compacting chamber, the fluid exerting pressure on the diaphragm in order to force the liquid containing the powder of refractory ceramic particles or of refractory ceramic precursor particles to pass through the fiber texture.

6. A method according to claim 1, wherein, during the step of forming the fiber texture, the yarns are woven with three-dimensional weaving or multilayer weaving.

7. A method according to claim 1, wherein the yarns of the preform are made of fibers constituted by one or more of the following materials: alumina; mullite; silica; an aluminosilicate; a borosilicate; silicon carbide; and carbon.

8. A method according to claim 1, wherein the refractory ceramic particles are made of a material selected from: alumina; mullite; silica; an aluminosilicate; an aluminophosphate; zirconia; a carbide; a boride; and a nitride.

9. A method according to claim 1, wherein the composite material part that is obtained constitutes a turbine engine blade, an afterbody part, a combustion chamber, a flap, or an afterburner arm.

10. A method according to claim 1, wherein the first direction is perpendicular to the second direction.

* * * * *